Patented Nov. 22, 1938

2,137,973

UNITED STATES PATENT OFFICE 2,137,973

CORN CONVERSION PROCESS

Raymond E. Daly and James F. Walsh, Chicago, Ill., assignors to American Maize-Products Company, a corporation of Maine No Drawing. Application August 4, 1937, Serial No. 157,280

4 Claims. (Cl. 127—38)

Our invention relates to corn conversion processes and more particularly to acid conversion of corn starch into glucose and sugars, the conversion being carried out in the presence of substantial amounts of the soluble and insoluble proteins contained in corn and the conversion reaction conditions being regulated to compensate for the proteins and avoid undesired reversion and darkening of the final product. This application is a continuation in part of our application Serial No. 719,336, filed April 6, 1934.

Heretofore in the manufacture of corn sugar or corn syrup of good quality it has been universally accepted in the trade that one must use a corn starch carefully purified of protein matter. This involves a slow cumbersome operation known as tabling, which demands large amounts of floor space and involves very considerable expense; but nevertheless has been believed to be essential.

In accordance with our invention we have discovered that the troublesome tabling operation is unnecessary and that separation of the proteins from the starch prior to conversion can be avoided provided the concentration of the starch, strength of the acid, pressure, and time of conversion are properly regulated. The color and other desired characteristics of the resulting syrup or sugar product will not be adversely affected by the presence of the protein during conversion. The corn material to be converted is preferably reduced to a fine state of sub-division and largely purified of fiber and oil. With this form of material and the conversion conditions properly fixed the presence of proteins has no very serious effect on the conversion action.

In our conversion process some of the insoluble proteins usually will be converted into various protein derivatives and amino acids and rendered soluble. Subsequent to the conversion substantially all of the soluble and insoluble proteins can be removed, if desired, to make a final product of as high a grade of purity as that made from a carefully tabled starch. However, we have found that the removal of the soluble proteins present after conversion is not essential. The converted liquor containing some soluble proteins when concentrated to a point at least equal to that of ordinary commercial syrups, will keep quite satisfactorily. The presence of proteins in the syrup adds to its food value, if the material is to be used for that purpose, and if the syrup or sugar is to be used for fermentation the presence of proteins is of definite value as supplying a food for the fermentation bacteria and yeast.

In the general procedure for carrying out our invention, the corn is treated in the regular manner up to the point of tabling. Thus a standard procedure is one in which the corn is steeped in sulphurous acid and is then cracked to release the germ. The cracked corn then goes to the germ separators where by flotation the germs are removed, leaving a slurry of the remaining constituents of the corn which is known as coarse slop. The oil is contained principally in the germ and is removed when the germ is floated off. The remaining slop is subjected to additional operations such as grinding and coarse reeling to remove fibrous particles, and finally passed through fine reels to produce a mixture of fine starch and protein or gluten.

At this stage in the operation, the starchy material sometimes referred to as "mill house starch" or "table head starch", will be in the form of a fine suspension having a total solid content comprising from about 90% to 95% starch and from about 0.5% to 2% soluble protein matter and associated soluble salts, with the balance insoluble protein or gluten. These percentages are given only by way of example, as they will vary over wide limits, depending on the details of the process employed. It is customary before starting the conversion operation to bring the fine starch and protein suspension to a standardized specific gravity or water concentration. This may be done either by settling or by filtration and the method employed for this step is one of the factors affecting the protein concentration. If settling is employed, the soluble proteins are removed only in direct proportion to the water eliminated, whereas, if the starch is concentrated on a filter, it is frequent practice to wash the solid matter on the filter which in this case eliminates the bulk of the soluble proteins.

Ordinarily the percentage of insoluble proteins or gluten present in the material to be converted will depend largely upon the type of corn used, but it is obvious that this may be modified by some method of coarse separation such as partial settling. However, for the purposes of this invention it is presumed that the starchy suspension to be used in the conversion operation will have a total protein content of about 4% to 7% and substantially all of its normal insoluble protein content.

The conversion operation characteristic of our invention is conducted by treating (under special conversion conditions explained below) the starch suspension containing soluble and insoluble proteins at an elevated temperature with a highly ionizable acid such as hydrochloric acid. We have found that the presence of soluble and insoluble proteins will tend to retard the conversion of the starch, and this must be compensated for in such a manner that there is neither serious reversion nor darkening of the resulting product. Varying factors bearing on this problem are the concentration of the starch subjected to the conversion treatment, the strength of acid, the temperature employed (this is usually measured in steam pressure) and the time of treatment. Thus an increase in the strength of acid relative to the concentration of starch in the suspension, or in other words a decrease in the concentration of the starch, will tend to accelerate the conversion, as will also an increase in temperature. The increase in temperature, however, will also tend to increase the degree of hydrolysis of the insoluble proteins and thus increase the concentration of soluble protein in the conversion product.

In accordance with one illustrative embodiment of our process for making glucose from the fine starchy suspension, which is substantially free of fiber and oil and which contains soluble and insoluble proteins, the following operating conditions have proven entirely satisfactory: approximately 1950 gallons of a 12° Bé. suspension of the starchy material are treated with 160 pounds of concentrated hydrochloric acid for from 12 to 15 minutes at a steam pressure of from 30 to 35 pounds. These conditions are in contrast to a standard starch conversion treatment in which a 22° Bé. suspension of the pure starch, previously separated from soluble and insoluble proteins by tabling or other means, is employed and from 75 to 135 pounds of acid to a like amount of suspension, the conversion treatment being continued for from 10 to 12 minutes.

When it is desired to carry the conversion treatment further and produce sugars our same procedure as outlined above for glucose may be used except that the operating pressure should be increased to about 45 pounds, and the conversion treatment should be carried on for from 25 to 30 minutes. A comparative standard sugar process using starch substantially free of proteins would employ a 16° Bé. starch suspension and 130 pounds of acid with the treatment continuing from 18 to 22 minutes.

Following the completion of the special conversion operation described above, the resulting liquor is neutralized preferably to approximately the isoelectric point (a pH value of about 4.8 to 5) to effect coagulation of the protein matter, and then for most purposes the liquor will be filtered, removing substantially all of the insoluble proteins and some of the coagulated solubles. Actually, if selective neutralizations are used to the isoelectric points of the various soluble protein bodies, the latter can be largely eliminated at this time. The soluble protein content of the liquor as it comes from the filters normally ranges from about 0.5% to about 5%, though usually the corn used will contain somewhat less than 3% of soluble proteins based upon the dry weight of total solids. Where desired, this soluble protein content may be reduced by filtering the conversion liquor through bonechar or other decolorizing carbons. This filtering may be repeated after the liquor has been concentrated to a syrup. The remaining converted liquor may be concentrated in the usual vacuum pans to any desired extent and used for any of the various purposes for which glucose made by standard conversion processes is used.

In connection with the above described procedures for removing proteins after conversion we have also found that this may be accomplished by combining with the starch at the time of conversion an adsorptive body such as bentonite clay. This clay is thoroughly disseminated through the starch mass during the conversion treatment and is subsequently removed when the liquors are filtered to remove the coagulated proteins. This use of an adsorptive material will facilitate removal of the protein content, where desired, without substantially adding to the expense of the conversion operation.

Where the final product is to be used for fermentation there is a material saving in operation cost if the filtered conversion liquors are used as such without the usual extensive concentration of the liquors into the form of heavy syrups. For example, the liquor may be neutralized and filtered to remove the insoluble proteins and then concentrated to a relatively small degree sufficient to render it stable and otherwise suitable for fermentation purposes. In this case it is not of advantage to remove the soluble proteins for their presence will aid in accelerating the fermentation action. The liquor prepared for this purpose will usually contain more than 1% and preferably more than 1.5% (on a dry basis) of protein bodies, ranging up to about 5%. These protein bodies comprise the original corn proteins but which have been partially hydrolyzed during the conversion action to a more assimilable form and are therefore more useful in fermentation processes. We believe that the inclusion of these protein derivatives in the syrups or sugars of our invention adds definite values to these products. For example, corn sugars and corn syrups are now being used for infant and invalid feeding and in the formulas employed, protein matter has to be added. The inclusion, according to our present invention, of substantial quantities (in excess of .75%) of natural but partially hydrolyzed proteins is a step in this direction and gives a valuable product.

Various changes and modifications may be made in the materials and processes described hereinabove, without departing from the scope of our invention. Some of the novel features of our invention are covered by the appended claims.

We claim:

1. The process of producing corn starch conversion products which comprises treating corn to produce a water suspension of fine starch and protein matter substantially in the form known as mill-house starch, effecting conversion of the starch by adding hydrochloric acid in the proportion of about 160 pounds of concentrated acid to 1950 gallons of 12° Bé. suspension of the starch, treating for from 12 to 15 minutes at a steam pressure of from 20 to 35 pounds and thereby effecting a conversion of the starch and at the same time effecting conversion of some of the insoluble protein into soluble form; thereupon neutralizing to approximately the isoelectric point to coagulate insoluble proteins and some of the soluble protein and filtering out said coagulum.

2. A process of converting corn to produce sugar without employing the usual tabling operation comprising treating the corn to remove the bulk of the oil and fiber constituents, reducing the remaining starch and protein components to a fine state of subdivision, forming a water suspension of these finely divided materials, adding approximately 160 pounds of concentrated hydrochloric acid to approximately 1950 gallons of said starch and protein suspension of approximately 12° Bé. concentration, heating for about 25 to 30 minutes at a steam pressure of about 45 pounds to effect conversion of the starch components into sugar and conversion of some of the insoluble protein into soluble form, neutralizing the conversion liquor to coagulate the insoluble proteins, and filtering to remove the coagulum.

3. The process of producing cornstarch conversion products which comprises treating corn to produce a water suspension of fine starch and protein matter substantially in the form known as mill-house starch, effecting conversion of the starch by adding hydrochloric acid in the proportion of about 160 pounds of concentrated acid to 1950 gallons of 12° Baumé suspension of the starch, treating for from 12 to 15 minutes at a steam pressure of from 20 to 35 pounds and thereby effecting a conversion of the starch and at the same time effecting conversion of some of the insoluble protein into soluble form; filtering to remove the insoluble proteins and leaving said soluble proteins in the filtered starch conversion liquor.

4. The process of producing a cornstarch conversion liquor containing from about 0.5% to 5% soluble proteins and adapted for fermentation purposes comprising, treating a water suspension of finely ground cornstarch and proteins, which has a total soluble and insoluble protein content of about 4% to 7%, with about 160 pounds of a concentrated highly ionizable starch conversion acid for each 1950 gallons of a 12° Bé. suspension of the starch, treating for 12 to 15 minutes at a steam pressure of from about 30 to 35 pounds and thereby effecting conversion of the starch and at the same time effecting hydrolysis of some of the insoluble protein into soluble form, filtering to remove the remaining insoluble proteins leaving the original soluble proteins and the soluble proteins resulting from hydrolysis, in the conversion liquor and concentrating said conversion liquor containing soluble proteins a relatively small amount just sufficient to stabilize said liquor and insufficient to form the usual heavy syrup.

RAYMOND E. DALY.
JAMES F. WALSH.